US012671878B2

(12) United States Patent
Murudkar et al.

(10) Patent No.: US 12,671,878 B2
(45) Date of Patent: Jun. 30, 2026

(54) SYSTEMS AND METHODS FOR AUTOMATED METADATA GENERATION FOR MULTIMEDIA CONTENT USING MULTIMODAL DATA

(71) Applicant: Verizon Patent and Licensing Inc., Basking Ridge, NJ (US)

(72) Inventors: Adwait Ashish Murudkar, Somerville, NJ (US); Vidhya Seran, Irving, TX (US); Sergey Virodov, San Diego, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 94 days.

(21) Appl. No.: 18/427,443

(22) Filed: Jan. 30, 2024

(65) Prior Publication Data

US 2025/0247588 A1 Jul. 31, 2025

(51) Int. Cl.
| | |
|---|---|
| *H04N 21/84* | (2011.01) |
| *G06F 16/783* | (2019.01) |
| *G06V 20/40* | (2022.01) |
| *G06V 20/70* | (2022.01) |
| *H04N 21/234* | (2011.01) |
| *H04N 21/44* | (2011.01) |

(52) U.S. Cl.
CPC ........... *H04N 21/84* (2013.01); *G06F 16/783* (2019.01); *G06V 20/41* (2022.01); *G06V 20/49* (2022.01); *G06V 20/70* (2022.01); *H04N 21/23418* (2013.01); *H04N 21/44008* (2013.01)

(58) Field of Classification Search
CPC ............. H04N 21/84; H04N 21/23418; H04N 21/44008; G06F 16/783; G06V 20/41; G06V 20/49; G06V 20/70
USPC ........................................................ 386/239
See application file for complete search history.

(56) References Cited

U.S. PATENT DOCUMENTS

| | | | | |
|---|---|---|---|---|
| 11,468,675 | B1 * | 10/2022 | Agarwal | ............ G06Q 30/0643 |
| 2016/0048723 | A1 * | 2/2016 | Jeong | ...................... G06F 18/22 |
| | | | | 382/197 |
| 2017/0195753 | A1 * | 7/2017 | Dakss | ................... G11B 27/031 |
| 2017/0270365 | A1 * | 9/2017 | Laska | ................. G06F 3/04842 |
| 2020/0213662 | A1 * | 7/2020 | Wolcott | ............. H04N 21/4131 |
| 2024/0193207 | A1 * | 6/2024 | Seyed Fathi | .......... G06F 16/783 |
| 2024/0314406 | A1 * | 9/2024 | Meier | .................... G06N 20/00 |
| 2024/0364970 | A1 * | 10/2024 | Coskun | ................. G06F 16/748 |
| 2025/0054519 | A1 * | 2/2025 | Hustwit | ............... G11B 27/031 |

* cited by examiner

*Primary Examiner* — Loi H Tran

(57) ABSTRACT

In some implementations, a device may receive a multimedia content file. The device may divide the multimedia content file into a set of logical entities. The device may generate a set of embeddings for each logical entity of the set of logical entities. The device may compare groups of logical entities, of the set of logical entities, to generate a similarity metric. The device may selectively merge, based on the similarity metric satisfying a threshold, a pair of logical entities, in a group of logical entities of the groups of logical entities, to generate one or more logical entity sets. The device may process the one or more logical entity sets to generate one or more metadata tags for the one or more logical entity sets. The device may store a metadata file including the one or more metadata tags.

19 Claims, 8 Drawing Sheets

200

Content Source 210

Network 240

User Device(s) 230

Content Processing Device 220

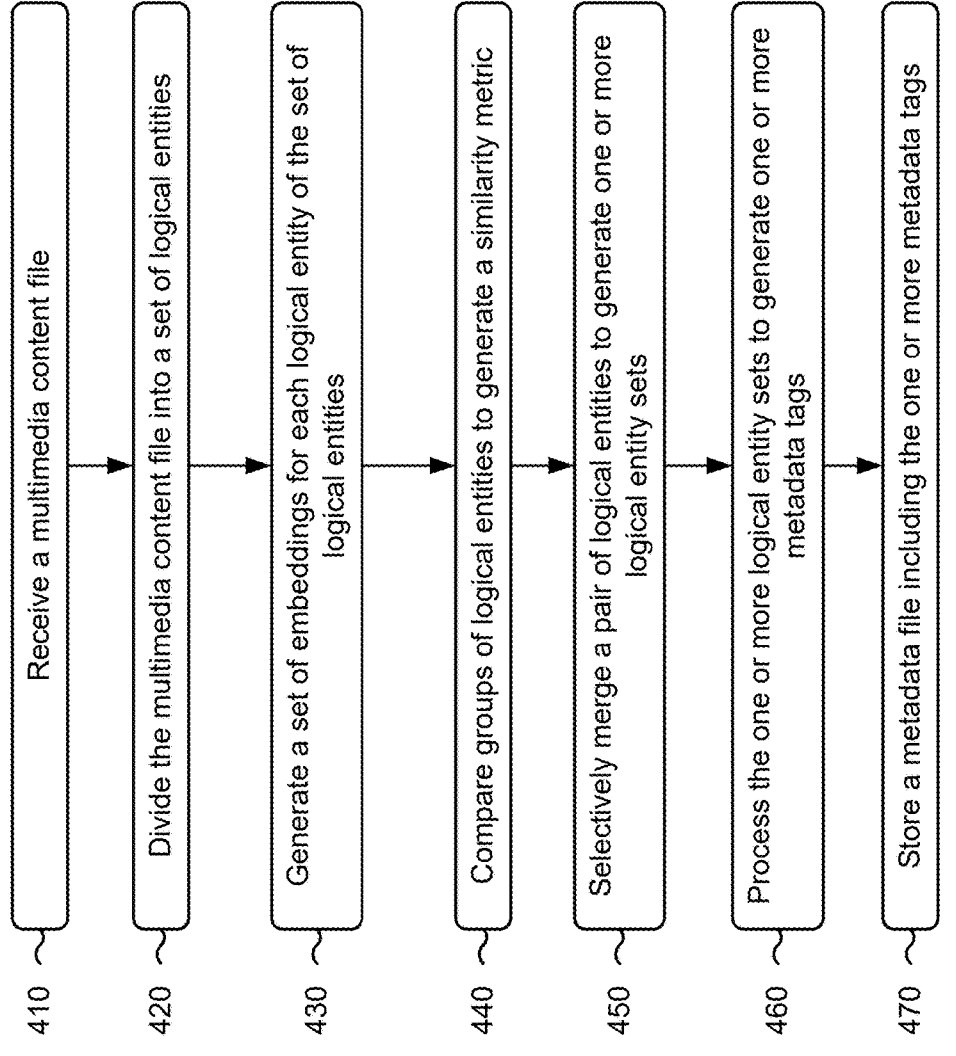

Receive a multimedia content file

410

Divide the multimedia content file into a set of logical entities

420

Generate a set of embeddings for each logical entity of the set of logical entities

430

Compare groups of logical entities to generate a similarity metric

440

Selectively merge a pair of logical entities to generate one or more logical entity sets

450

Process the one or more logical entity sets to generate one or more metadata tags

460

Store a metadata file including the one or more metadata tags

SYSTEMS AND METHODS FOR AUTOMATED METADATA GENERATION FOR MULTIMEDIA CONTENT USING MULTIMODAL DATA

BACKGROUND

File metadata includes information that a device may use to determine one or more characteristics or a content of a file. For example, a video file may include descriptive metadata identifying a runtime of video content of the video file, a file type of the video file, a size of the video file, or a date on which the video file was created. Additionally, or alternatively, the video file may include administrative metadata identifying ownership of the video file, access permissions of the video file, copyright information of the video, rights management information, or other parameters. Additionally, or alternatively, the video file may include structural metadata, such as information identifying whether the video file is an item in a series (e.g., a television episode in a particular season of a television show). Additionally, or alternatively, the video file may include content identification metadata, such as information identifying what is being depicted in the video.

BRIEF DESCRIPTION OF THE DRAWINGS

FIG. 4 is a flowchart of an example process associated with automated metadata generation for multimedia content using multimodal data.

DETAILED DESCRIPTION OF EXAMPLE EMBODIMENTS

Figure 1A:
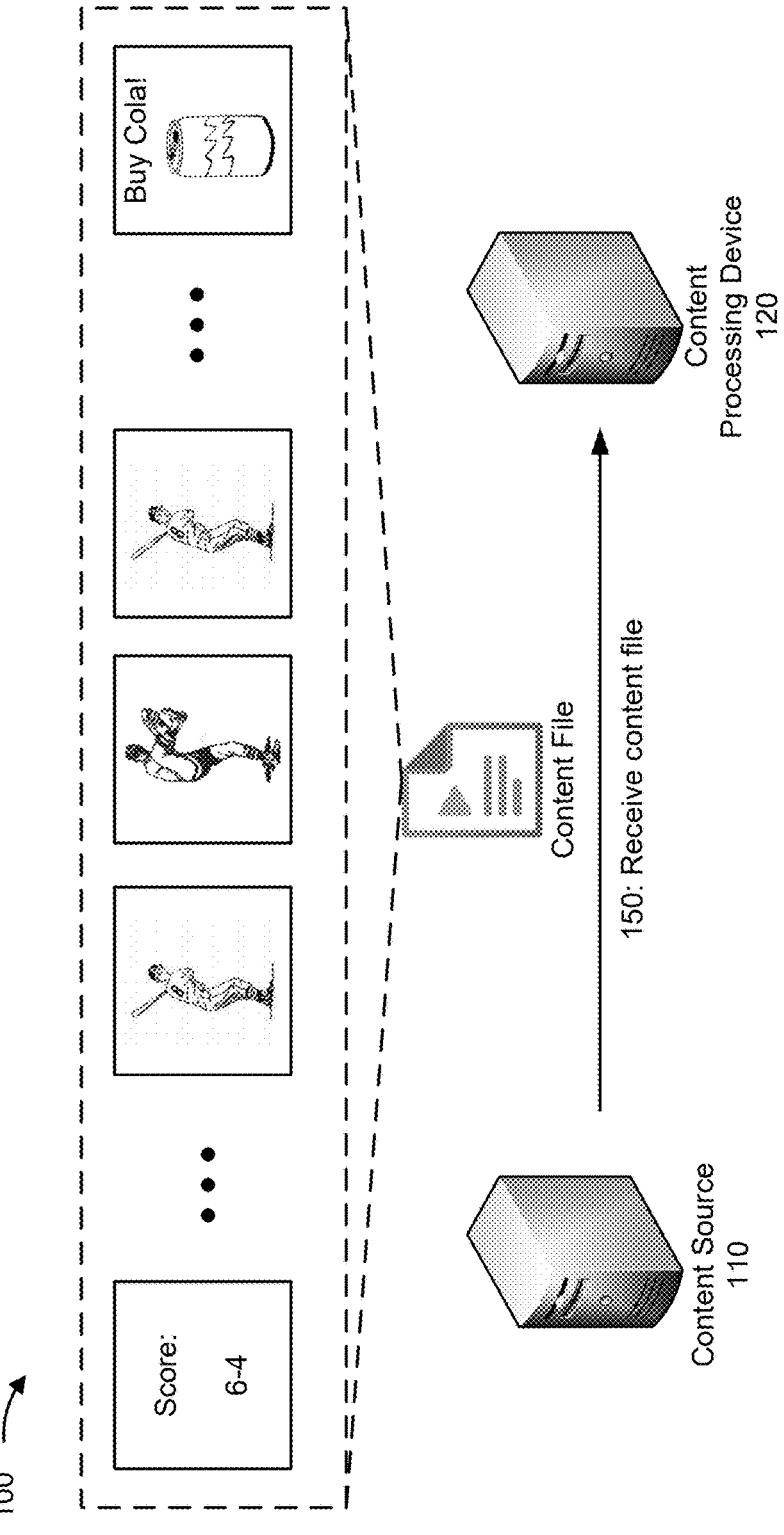
FIGS. 1A-1E are diagrams of an example associated with automated metadata generation for multimedia content using multimodal data.

The following detailed description of example implementations refers to the accompanying drawings. The same reference numbers in different drawings may identify the same or similar elements.

A multimedia content file may include multimedia content, such as video content, audio content, or virtual reality content, among other examples. Multimedia content may include multiple logical divisions. For example, video content (e.g., a movie or television show) may include multiple logical camera scenes. A scene (or logical camera scene) may refer to a single setting of a narrative, which is composed of one or more shots and captured via one or more cameras. Similarly, audio content (e.g., a radio show or podcast) may include multiple segments (e.g., a radio news program may include a local news segment, a sports segment, a national news segment, or a weather segment, among other examples). Each segment may include multiple subdivisions. For example, a logical camera scene of video content may include multiple logical camera shots, as described above. A shot may refer to an uninterrupted sequence of frames captured using a single camera. Accordingly, different shots may be associated with different lighting conditions, color composition, or motion. Similarly, for audio content, a logical segment may include multiple microphone recordings. In this context, a microphone recording may refer to an uninterrupted recording captured using a single microphone. Accordingly, different microphone recordings may be associated with different amounts of background noise, different voices, or different types of sounds.

As a specific example, a video may include a first scene in which two people are talking to each other and a second scene in which a single person is walking. In the first scene, different camera shots may capture the conversation from different angles. In the second scene, different camera shots may capture the single person walking from different angles. As another specific example, an audio news program may include a first segment in which a first announcer is talking about sports and a second scene in which a second announcer is talking about the weather. In the first segment, the first announcer may intersperse audio clips from a sports event being described (e.g., crowd noise or player sounds). In the second segment, the second announcer may talk with an on-scene weather reporter resulting in a back-and-forth between the second announcer and the on-scene weather reporter.

When providing a multimedia content service, a content provider may tag the multimedia content to assist a user in identifying content. For example, a content provider may tag a beginning of a title sequence and an end of a title sequence and provide a user interface element (e.g., a button) with which a user may select to skip the title sequence. Similarly, a content provider may tag a beginning of an end-credits sequence of an episode of a television series and automatically skip the end-credits sequence and proceed to a next episode of the television series. In an audio context, a content provider may tag a beginning and an end of an advertisement sequence and prevent a user from skipping the advertisement sequence. Or, alternatively, the content provider may enable a premium user (e.g., who has paid for an advertisement-free experience) to automatically skip the advertisement sequence.

Content providers may use manual annotation to identify different scenes. For example, a content provider may have a person manually review an item of content and add a pre-selected set of tags to the item of content (e.g., a title sequence start tag, an advertisement start tag, a credit sequence start tag, etc.). However, this may result in static, inaccurate tagging. For example, whenever a new tag is determined, each item of content must be manually reviewed to add the new tag. As content levels expand rapidly to billions of hours of content being produced, manual static tagging is infeasible for content providers. Moreover, a delay in manual review of items of content results in tagging being infeasible for live-streamed items of content.

Alternatively, the content provider may use text recognition to automatically apply some type of tags. For example, the content provider may use text recognition to determine that a threshold amount of text is present on a screen, indicating that a credit sequence has started. However, text recognition may be inaccurate for some items of content that include relatively large amounts of text in non-title or non-credit sequences. Furthermore, based on logical entities (e.g., logical video scenes or audio segments) having multiple entity sets (e.g., groups of camera shots or groups of audio clips), some automated processes for scene detection may incorrectly detect an end of a scene based on an end to a camera shot occurring. In other words, some automated processes may detect each different camera shot, within a single logical camera scene, as a different scene, resulting in inaccurate tagging. Inaccurate tagging may result in excessive use of computing resources for users to identify desired items of content. For example, a user attempting to receive a radio program that includes a detailed recounting of a sports event may request audio clips of at least a threshold amount of time. However, inaccurate tagging may result in a single audio segment of at least the threshold amount of time being tagged as multiple audio segment of less than the threshold amount of time (e.g., as a result of interspersed audio clips being inaccurately tagged as individual segments). Accordingly, a user device of the user may traverse multiple webpages or servers to identify a matching clip, which may result in an excessive use of network, energy, or computing resources.

Some implementations described herein enable automated metadata generation for multimedia content using multimodal data. As a result, a content processing device can tag items of multimedia content automatically, thereby enabling the content processing device to provide information relating to the multimedia content. For example, the content processing device may provide user interface elements relating to the multimedia content, thereby enabling a user device to skip portions of the multimedia content, which may reduce a utilization of network, processing, or energy resources relative to playing an entirety of the multimedia content. Additionally, or alternatively, the content processing device may respond to search queries with a higher degree of accuracy based on enabling tagging of the multimedia content. For example, a content processing device may generate logical entity set level tagging (e.g., logical camera scene tagging) by combining multiple logical entities (e.g., multiple logical camera shots) into a single logical entity set. In this case, a tag that the content processing device generates based on the logical entity set may be more accurate than a tag that can be generated based on a single logical entity, thereby improving an accuracy of search results that are based on the tag. In other words, a tag generated using a single logical camera shot may be generated as "Person Talking," but a tag generated using a logical camera scene may be generated as "Two People Talking to Each Other," which may result in a more accurate search result being provided.

FIGS. 1A-1E are diagrams of an example 100 associated with automated metadata generation for multimedia content using multimodal data. As shown in FIGS. 1A-1E, example 100 includes a content source 110, a content processing device 120, and one or more user devices 130.

As further shown in FIG. 1A, and by reference number 150, the content processing device 120 may receive a content file. For example, the content processing device 120 may receive a file including multimedia content, such as video content (e.g., a film, television show, sports program, etc.), audio content (e.g., a radio program, a podcast, a teleconference meeting), or virtual reality content (e.g., a virtual reality location). In some implementations, the content processing device 120 may receive a content file based on a content file being stored in the content source 110. For example, when a content file is uploaded to the content source 110 (e.g., for distribution to a set of user devices 130 via a content delivery network (CDN)), the content source 110 may transmit an alert to the content processing device 120 indicating that a new content file (e.g., a new video file, a new audio file, a new virtual reality file, or a new data stream) is available. Additionally, or alternatively, when the content processing device 120 receives information identifying a new tag to add to content files, the content processing device 120 may request content files from the content source 110 to enable processing to add the new tag to one or more of the content files.

In some implementations, the content processing device 120 may receive the content file concurrent with generation of the content file or the content thereof. For example, the content processing device 120 may receive a live data stream of real-time or near-real-time content. As an example, the content processing device 120 may receive a live data stream of video content (e.g., a news program or sports program). Additionally, or alternatively, the content processing device 120 may receive a live stream of audio content (e.g., a radio program). In this case, the content processing device 120 may generate metadata for the content in real-time or near-real-time. For example, as described in more detail herein, the content processing device 120 may generate metadata that is served to a user device with the live streamed content (e.g., with less than a threshold delay).

Figure 1B:
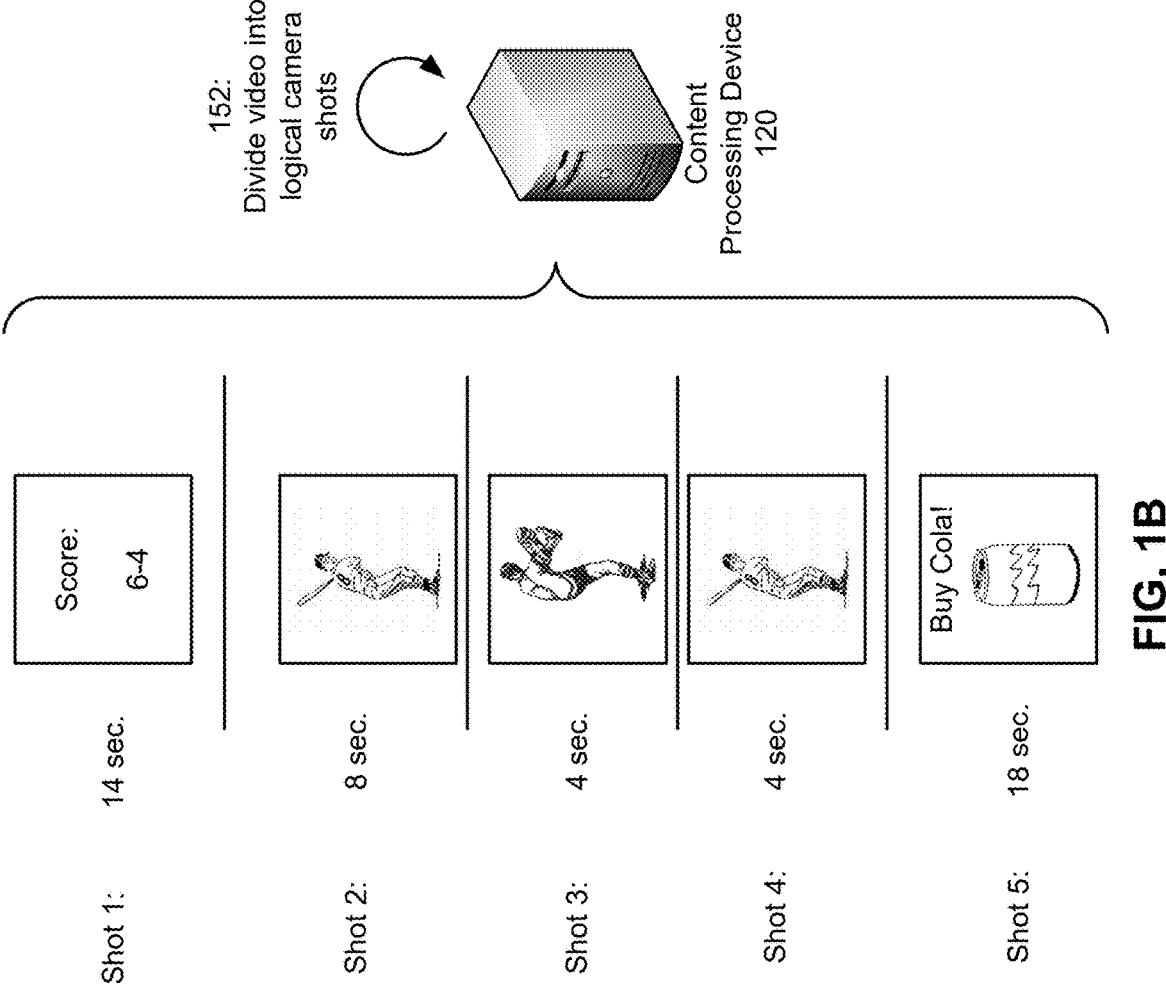

As shown in FIG. 1B, and by reference number 152, the content processing device 120 may divide the content file into a set of logical entities. For example, the content processing device 120 may identify a set of logical camera shots in video content of a video content file. Additionally, or alternatively, the content processing device 120 may identify a set of logical audio clips in audio content of an audio content file. In the context of video processing, different logical camera shots may be associated with sharp transitions between aspects of the video (e.g., in contrast with soft transitions which may correspond to movement within the video). For example, the content processing device 120 may process a set of pixels of a set of frames of the video to identify a change to a lighting condition, a color composition, or a type or characteristic of motion within the set of frames. In this case, the content processing device 120 may use a machine learning model to process sets of frames and aggregate sets of frames into logical camera shots. Additionally, or alternatively, the content processing device 120 may use a computer vision technique, such as comparison, between adjacent frames, of hue-saturation-lightness (HSL) values, edges, or another characteristic to determine a start and/or an end to a camera shot. In an audio context, the content processing device 120 may identify logical audio clips, which may represent frames of audio content aggregated based on sharp transitions between vocal characteristics of a speaker, background sound characteristics, volume characteristics, or another characteristic.

As a specific example, in a sports event, a first logical camera shot may be a title card that shows a score of the sports event, a second logical camera shot may be video from a first camera at a first position showing a batter, a third logical camera shot may be video from a second camera at a second position showing a pitcher, a fourth logical camera shot may be video from the first camera at the first position showing the batter, and a fifth logical camera shot may be a commercial that interrupts footage of the sports event.

Figure 1C:
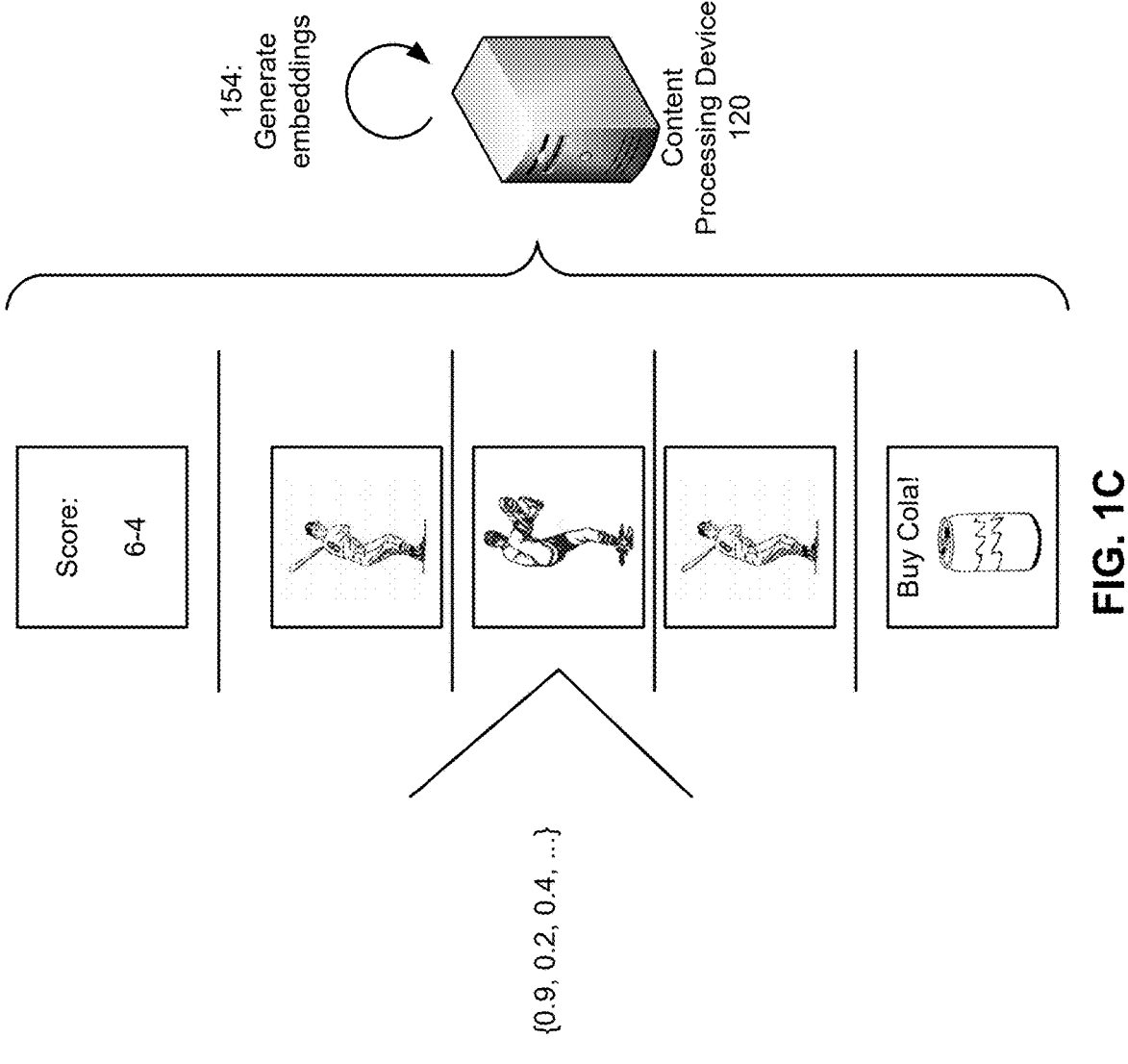

As shown in FIG. 1C, and by reference number 154, the content processing device 120 may generate embeddings for the set of logical entities. For example, the content processing device 120 may process a logical entity to generate one or more embeddings for the logical entity. An embedding may include an n-dimensional numeric representation of a content of a logical entity. For example, an embedding may be a vector representing one or more features of the logical entity, such as a set of numeric values representing the one or more features. In a video context, the content processing device 120 may process a set of frames as a single logical camera shot and generate one or more embeddings for the single logical camera shot. For example, the content processing device 120 may generate one or more numeric values to represent a brightness, color, group of pixels, or other characteristic of a logical camera shot. Similarly, in an audio context, the content processing device 120 may process a set of frames as a single logical audio clip and generate one or more embeddings for the single logical audio clip. For example, the content processing device 120 may generate one or more embeddings to represent a volume, modulation, frequency, or other characteristic of a logical audio clip.

In some implementations, the content processing device 120 may use a transformer to generate a set of embeddings for a set of logical entities. For example, the content processing device 120 may apply a zero-shot video transformer to generate one or more embeddings for each logical camera shot. In some implementations, the content processing device 120 may determine that a logical entity exceeds a threshold duration. For example, the content processing device 120 may determine that a logical camera shot is longer than a threshold amount of time. In this case, the content processing device 120 may split the logical camera shot into a plurality of logical camera shots (e.g., each with a duration that is less than the threshold amount of time) and may generate one or more embeddings for each of the plurality of logical camera shots.

Figure 1D:
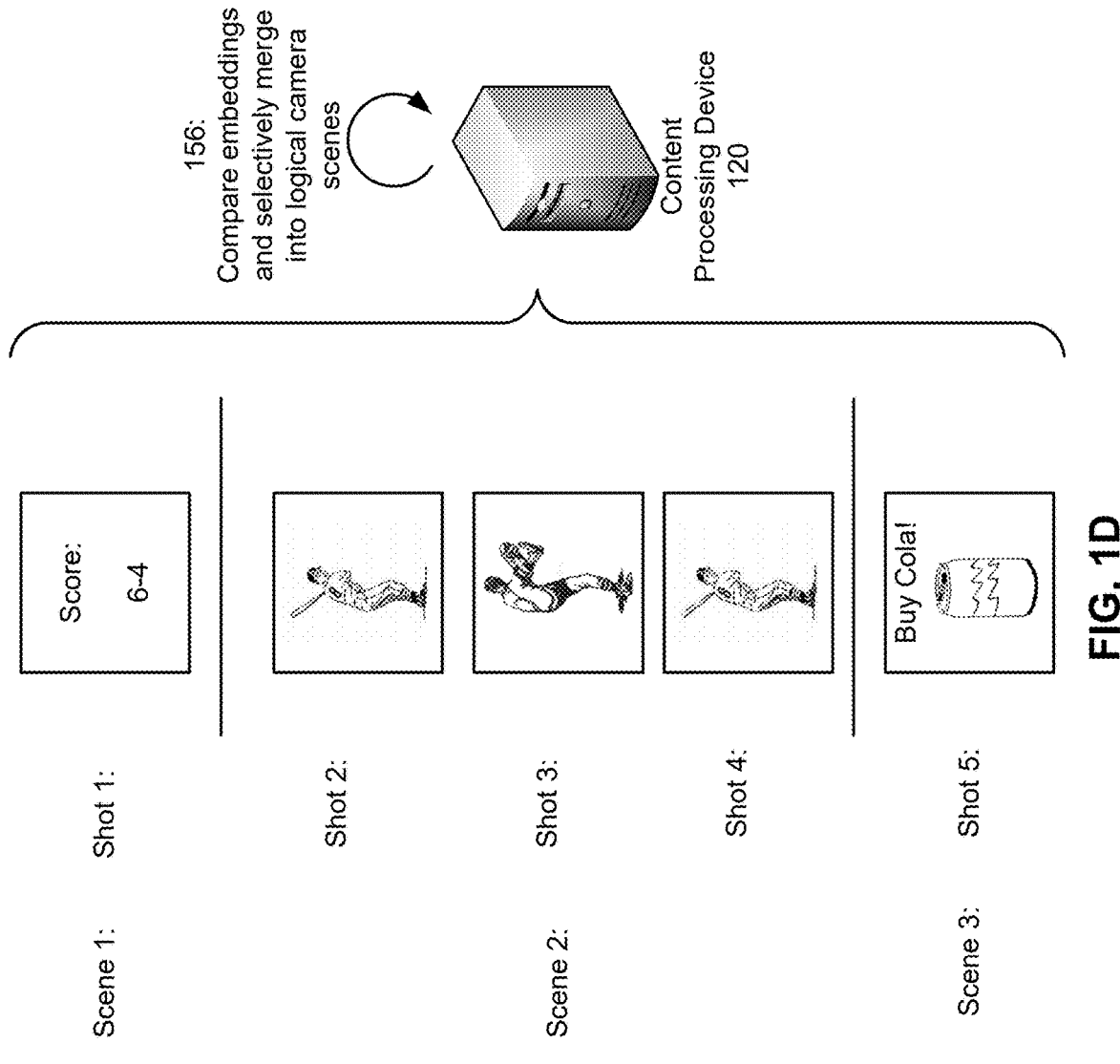

As shown in FIG. 1D, and by reference number 156, the content processing device 120 may compare the embeddings and selectively merge logical entities into logical entity sets. For example, the content processing device 120 may use a comparison technique to compare groups of logical entities and determine whether pairs of logical entities within a group of logical entities have a threshold similarity metric. In this case, the content processing device 120 may use a cosine similarity metric to determine whether consecutive logical entities (or groups of consecutive logical entities) share the threshold similarity metric. In some implementations, the content processing device 120 may generate a function of multiple embeddings to compare the multiple embeddings for a pair of logical entities. For example, the content processing device 120 may use a function to generate a set of M×N embeddings and may compare outputs of the function to compare pairs of logical entities and merge pairs of logical entities into logical entity sets. As one example, the content processing device 120 may generate both video embeddings and audio embeddings and compare both the video embeddings and the audio embeddings (or a linear combination thereof) across logical entities to generate logical entity pairs.

In some implementations, the content processing device 120 may determine that pairs of logical entities have a similarity metric that satisfies the threshold similarity metric value and may merge the pairs of logical entities. For example, the content processing device 120 may determine that the second and fourth logical camera shots, as shown, are associated with a similarity metric that satisfies the threshold similarity metric value. In this case, the content processing device 120 may merge the second and fourth logical camera shots into a single logical camera scene. Additionally, or alternatively, based on the third camera shot being disposed between the second and fourth camera shots in a consecutive order, the content processing device 120 may merge the third logical camera shot with the second and fourth logical camera shot to generate a single logical camera scene. In other words, for the shots 1 through 5, shown in FIGS. 1A-1E, the content processing device 120 may identifies a first scene that includes the first logical camera shot, a second scene that includes the second through fourth logical camera shot, and a third scene that includes the fifth logical camera shot.

In some implementations, the content processing device 120 may perform a merging process iteratively. For example, the content processing device 120 may merge consecutive similar shots into logical camera scenes and may repeat the merging process over multiple instances until a higher-order metric is satisfied. In this way, the content processing device 120 may generate logical entity sets for logical entity set level metadata generation, which enables more accurate metadata tagging that can be achieved using only logical entity level metadata generation (e.g., metadata generation for each frame or each logical camera shot).

Figure 1E:
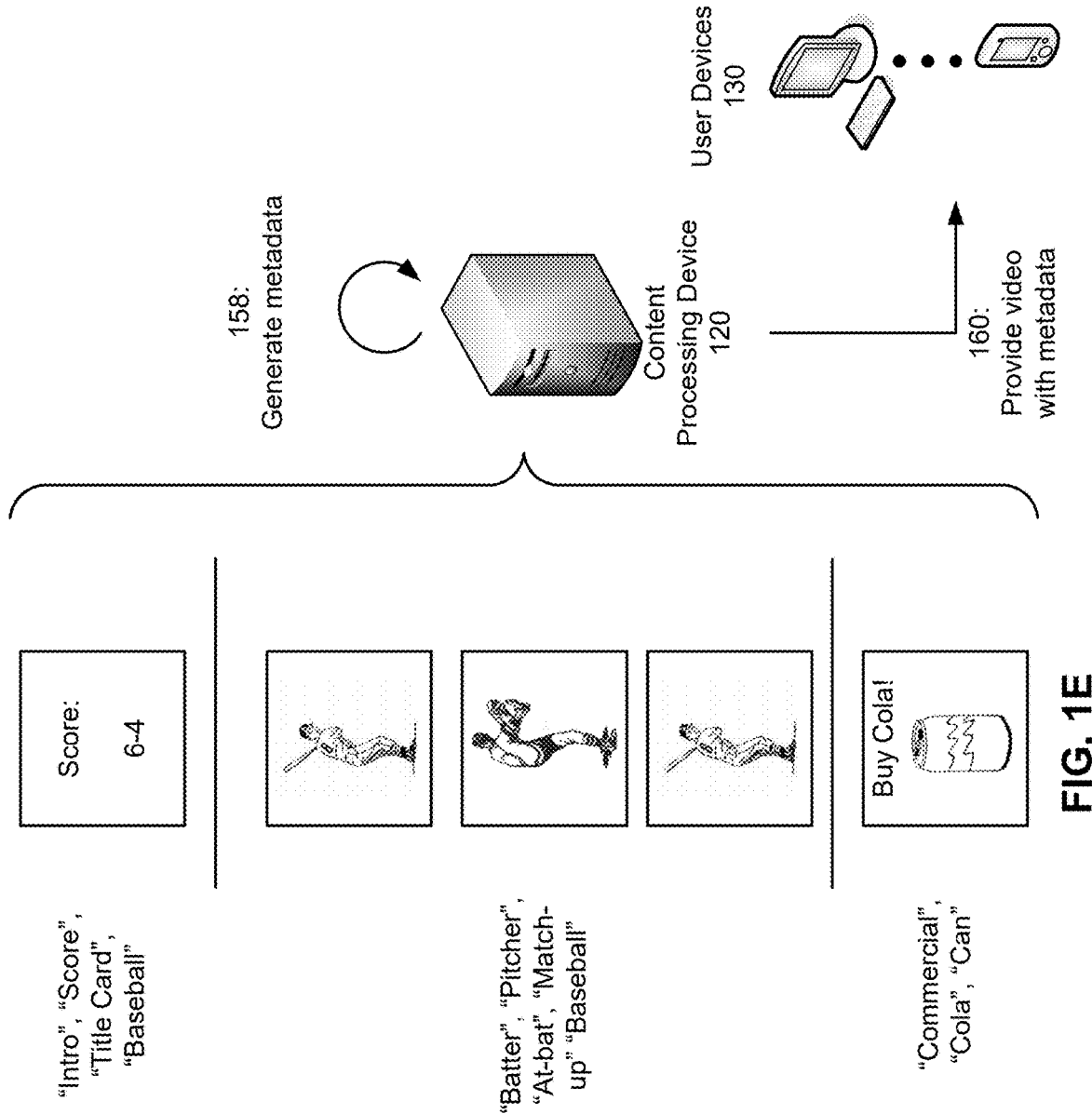

As shown in FIG. 1E, and by reference number 158, the content processing device 120 may generate metadata for one or more logical entity sets. For example, the content processing device 120 may apply one or more of a configured set of metadata tags to one or more logical entity sets. In some implementations, the content processing device 120 may use a computer vision technique to generate metadata for one or more logical entity sets. For example, the content processing device 120 may apply a computer vision algorithm to frames of a logical camera scene and generate a logical camera scene level set of tags based on objects, text, or audio recognized in the logical camera scene. Additionally, or alternatively, the content processing device 120 may use large language model (LLM) techniques or other natural language processing techniques to dynamically generate new metadata (e.g., which may include new tags not previously specified for any logical entities). For example, the content processing device 120 may use computer vision to recognize one or more objects in a logical camera scene and may use an LLM to generate a description of the one or more objects, with the description (or portions thereof) being used as metadata.

As a specific example, the content processing device 120 may generate different metadata tags for each logical camera scene identified for the video content file, as shown in FIGS. 1A-1E. For example, the content processing device 120 may generate the metadata tags "Batter," "Pitcher," "At-bat," "Match-up," and "Baseball" for the second logical camera scene. In this case, by generating metadata tags at a logical camera scene level, the second logical camera scene is tagged with both "Batter" and "Pitcher", whereas a frame level (or logical camera shot level) may only include tags for "Batter" or "Pitcher" (in other words, the batter and pitcher never appear in the same frame in this case).

As further shown in FIG. 1E, and by reference number 160, the content processing device 120 may provide multimedia content in connection with generating the metadata. For example, the content processing device 120 may receive a search query from a user device 130 and may identify and provide a set of search results using the metadata. In this case, the content processing device 120 may receive a search query for "Video of a Pitcher" and may return the second logical camera scene as a response to the search query based on the metadata tagged for the second logical camera scene. In this case, based on using logical camera scene level metadata, the content processing device 120 may provide a more complete result than may be achieved by frame level techniques, which may only result in returning video of the pitcher (e.g., the third logical camera shot), rather than a whole at-bat.

Additionally, or alternatively, the content processing device 120 may provide the multimedia file (or a portion thereof) with a metadata file and/or one or more user interface elements generated using the metadata file. For example, the content processing device 120 may include (or may instruct the user devices 130) to include buttons for skipping a title card or end credits scene in connection with metadata tagging thereof. Additionally, or alternatively, the content processing device 120 may generate contextual information associated with the metadata, such as information identifying objects or actors appearing in a logical camera scene and provide the contextual information to the user devices 130 for non-real-time, real-time, or near-real-time playback of multimedia content included in multimedia content files.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
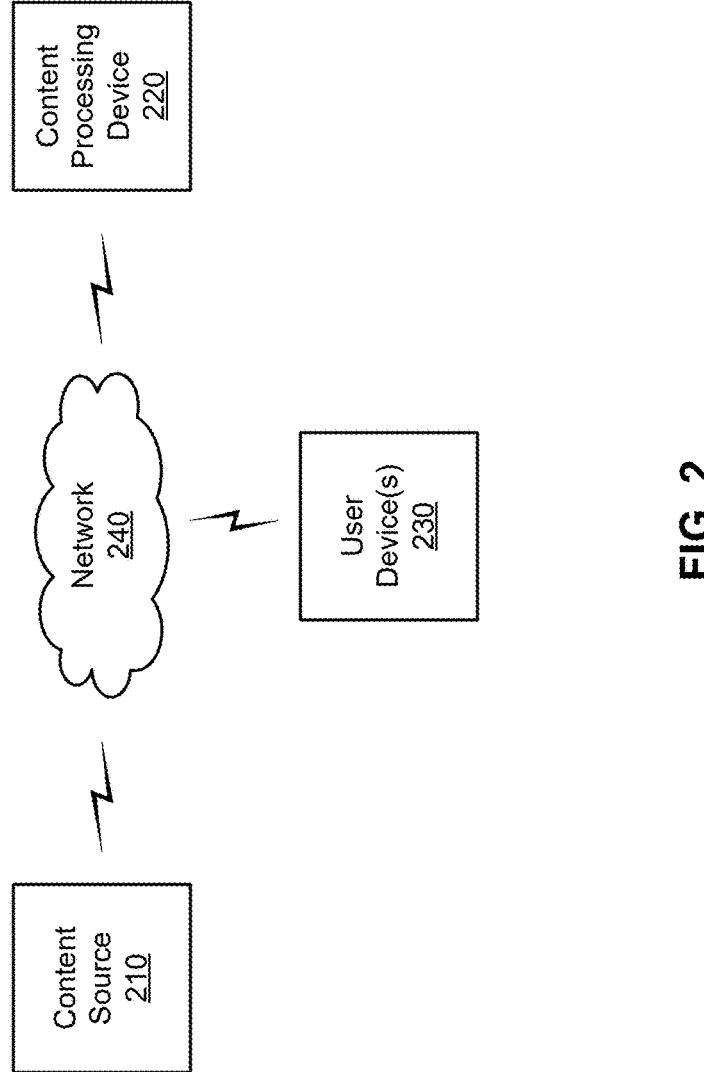
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a content source 210, a content processing device 220, one or more user devices 230, and a network 240. Devices of environment 200 may interconnect via wired connections, wireless connections, or a combination of wired and wireless connections.

The content source 210 may include one or more devices capable of receiving, generating, storing, processing, and/or providing information associated with multimedia content, as described elsewhere herein. The content source 210 may include a communication device and/or a computing device. For example, the content source 210 may include a database, a server, a database server, an application server, a client server, a web server, a host server, a proxy server, a virtual server (e.g., executing on computing hardware), a server in a cloud computing system, a device that includes computing hardware used in a cloud computing environment, a CDN device, or a similar type of device. The content source 210 may communicate with one or more other devices of environment 200, as described elsewhere herein. In some implementations, the content source 210 may correspond to the content source 110 of FIGS. 1A-1E.

The 220 content processing device may include one or more devices capable of receiving, generating, storing, processing, providing, and/or routing information associated with generating metadata tags for multimedia content, as described elsewhere herein. The 220 content processing device may include a communication device and/or a computing device. For example, the 220 content processing device may include a server, such as an application server, a client server, a web server, a database server, a host server, a proxy server, a virtual server (e.g., executing on computing hardware), a server of a CDN, or a server in a cloud computing system. In some implementations, the 220 content processing device may include computing hardware used in a cloud computing environment. In some implementations, the content processing device 220 may correspond to the content processing device 120 of FIGS. 1A-1E.

The user device 230 may include one or more devices capable of receiving, generating, storing, processing, and/or providing information associated with multimedia content, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 230 may correspond to the user device 130 of FIGS. 1A-1E.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
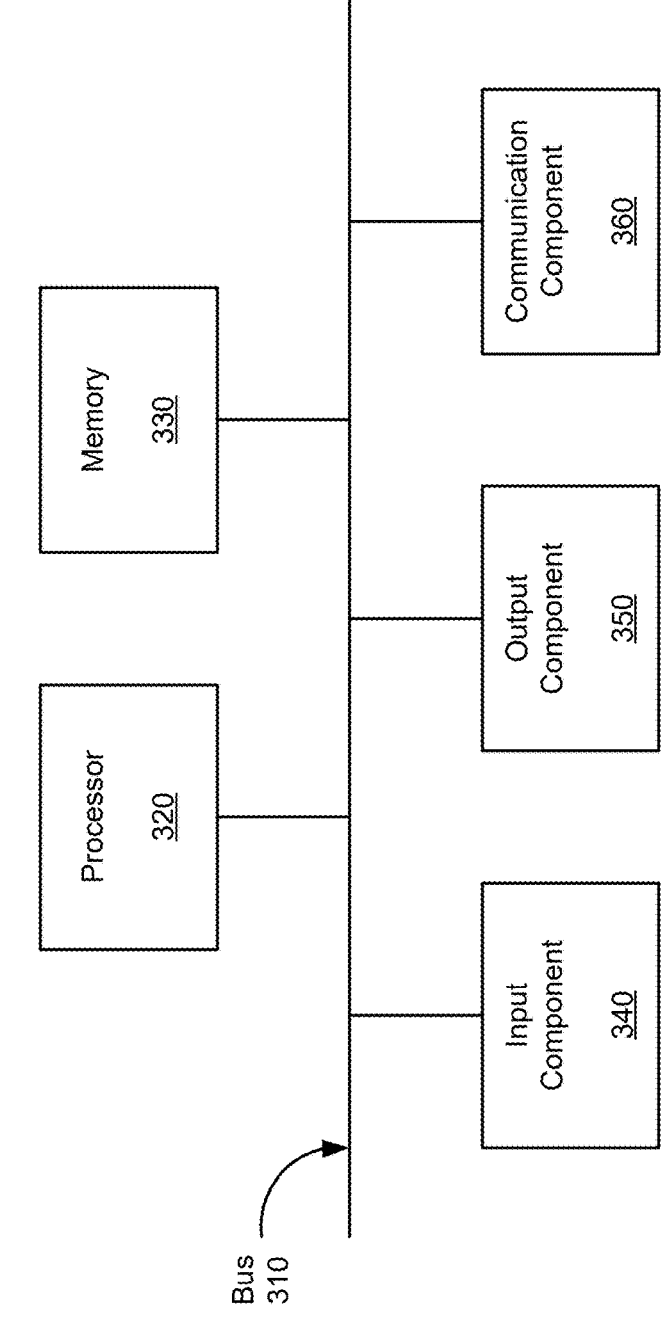
FIG. 3 is a diagram of example components of a device associated with automated metadata generation for multimedia content using multimodal data.

FIG. 3 is a diagram of example components of a device 300 associated with automated metadata generation for multimedia content using multimodal data. The device 300 may correspond to the content source 210, the content processing device 220, and/or the user device 230. In some implementations, the content source 210, the content processing device 220, and/or the user device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with automated metadata generation for multimedia content using multimodal data. In some implementations, one or more process blocks of FIG. 4 may be performed by a content processing device (e.g., content processing device 220). In some implementations, one or more process blocks of FIG. 4 may be performed by another device or a group of devices separate from or including the content processing device, such as a content source (e.g., content source 210) and/or a user device (e.g., user device 230). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a multimedia content file (block 410). For example, the content processing device may receive a multimedia content file, as described above. In some implementations, the multimedia content file includes video content. For example, a logical entity may be a logical camera shot and a logical entity set may be a logical camera scene. In some implementations, the multimedia content file includes audio content. For example, a logical entity may be a logical audio recording or audio clip a logical entity set may be logical audio segment. In some implementations, the multimedia content file does not include metadata labeling logical entities or logical entity sets. In other words, the multimedia content file may not already have metadata that identifies logical camera scenes or logical audio segments.

As further shown in FIG. 4, process 400 may include dividing the multimedia content file into a set of logical entities (block 420). For example, the content processing device may divide the multimedia content file into a set of logical entities, as described above. In some implementations, a single logical entity is divided into multiple of logical entities based on a length of the single logical entity. For example, long logical camera shots may be divided into multiple logical camera shots to reduce a processing complexity associated with generating and comparing embeddings.

As further shown in FIG. 4, process 400 may include generating a set of embeddings for each logical entity of the set of logical entities (block 430). For example, the content processing device may generate, using a machine learning model, a set of embeddings for each logical entity of the set of logical entities, as described above. In some implementations, the machine learning model includes at least one of a zero-shot video transformer model or a modality transformer model. In some implementations, a quantity of embeddings generated for each logical entity is associated with a length of each logical entity. For example, longer logical camera scenes may include a greater quantity of embedding values.

As further shown in FIG. 4, process 400 may include comparing groups of logical entities to generate a similarity metric (block 440). For example, the content processing device may compare groups of logical entities, of the set of logical entities, to generate a similarity metric, as described above. In some implementations, the similarity metric is a cosine similarity metric. For example, the content processing device may determine an angle between two vectors and determine whether the two vectors are pointing in the same direction to determine how related two vectors (and the underlying logical entities) are.

As further shown in FIG. 4, process 400 may include selectively merging a pair of logical entities to generate one or more logical entity sets (block 450). For example, the content processing device may selectively merge, based on the similarity metric satisfying a threshold, a pair of logical entities, in a group of logical entities of the groups of logical entities, to generate one or more logical entity sets, as described above. In some implementations, a logical entity set, of the one or more logical entity sets, includes one or more logical entities, as described above. In other words, some logical camera scenes may include multiple logical camera shots.

In some implementations, a first logical entity set includes a first logical entity and a second logical entity. In this case, a second logical entity set includes a third logical entity. Third logical entity may be between the first logical entity and the second logical entity in an order of logical entities within the multimedia content file. In other words, the content processing device may determine that a first logical camera scene is interleaved with a second, separate logical camera scene.

In some implementations, a logical entity set includes a first logical entity, a second logical entity, and a third logical entity in consecutive order. The first logical entity and the third logical entity may be associated with the similarity metric satisfying the threshold. In this case, the content processing device may include the second logical entity the logical entity set based at least on being between the first logical entity and the third logical entity in consecutive order. In other words, the content processing device may determine that logical camera shots which occur between pairs of similar logical camera shots, are part of a common scene.

As further shown in FIG. 4, process 400 may include processing the one or more logical entity sets to generate one or more metadata tags for the one or more logical entity sets (block 460). For example, the content processing device may process the one or more logical entity sets to generate one or more metadata tags, as described above. In some implementations, process 400 includes generating a metadata tag for a logical entity set, of the one or more logical entity sets, based on a computer vision analysis of one or more objects detected within the logical entity set. In some implementations, process 400 includes generating a metadata tag for a logical entity set, of the one or more logical entity sets, based on a natural language processing analysis of audio associated with the logical entity set. In some implementations, process 400 includes generating a metadata tag for a logical entity set, of the one or more logical entity sets, based on a position of the logical entity set within the one or more logical entity sets.

As further shown in FIG. 4, process 400 may include storing a metadata file including the one or more metadata tags (block 470). For example, the content processing device may store a metadata file including the one or more metadata tags in connection with the multimedia content file, as described above. In some implementations, process 400 includes receiving a request for the multimedia content file, and transmitting a message including the multimedia content file and the metadata file. For example, the content processing device may serve the multimedia file and the associated metadata file as a response to a request for the multimedia file (or for any multimedia file with metadata matching a request). In this case, matching a request or a search query may include having a matching score that satisfies a threshold. For example, the multimedia content file may use a search algorithm to rank matches between a search query and a metadata tag and may provide results with a higher rank as matches to the search query. Matches may include exact lexical matches, similar lexical matches, semantic matches, or other types of search matches.

In some implementations, process 400 includes accessing a data stream, the data stream being associated with providing the multimedia content file concurrently with generation of the multimedia content file, and transmitting the multimedia content file with the metadata file concurrently with generation of the multimedia content file. For example, the content processing device may include metadata in a live stream that is being provided to a user device.

In some implementations, process 400 includes receiving a search query, searching, using the search query, a data repository storing a set of metadata files that includes the metadata file for the multimedia content file, determining a match between the search query and a metadata tag of the metadata file, and returning, based on the match between the search query and the metadata tag, the multimedia content file. In some implementations, process 400 includes receiving a search query, searching, using the search query, a data repository storing a set of metadata files that includes the metadata file for the multimedia content file, determining a match between the search query and a metadata tag of the metadata file, and returning, based on the match between the search query and the metadata tag, a new multimedia content file including a logical entity set, of the one or more logical entity sets, associated with the match between the search query and the metadata tag. In other words, the content processing device may provide a particular logical camera scene that matches a search query or a whole multimedia content file that includes a particular logical camera scene that matches the search query.

In some implementations, process 400 includes obtaining the multimedia content file from a data repository, and storing a metadata file includes storing the metadata file in the data repository in association with the multimedia content file. For example, the content processing device may transmit a metadata file to a data repository that stores multimedia content files, thereby enabling the data repository to provide the metadata file with the multimedia content file or use the metadata file to organize or search the multimedia content file.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:
one or more processors configured to:
receive a video file;
process the video file to divide the video file into a set of logical camera shots;
process the set of logical camera shots using a machine learning model to generate a set of embeddings for each logical camera shot, of the set of logical camera shots, wherein a quantity of embeddings generated for each logical camera shot of the set of logical camera shots is based on a length of each logical camera shot;
compare groups of logical camera shots, of the set of logical camera shots, to generate a similarity metric;
selectively merge, based on whether the similarity metric satisfies a threshold, a pair of logical camera shots, in a group of logical camera shots of the groups of logical camera shots, to generate one or more logical camera scenes, wherein a logical camera scene, of the one or more logical camera scenes, includes one or more logical camera shots;
process the one or more logical camera scenes to generate one or more metadata tags for the one or more logical camera scenes;
transmit the one or more metadata tags concurrently with the generation of the one or more logical camera scenes, wherein the video file is associated with a live stream and the one or more metadata tags are included into the live stream; and
store a metadata file including the one or more metadata tags in connection with the video file;
wherein the one or more instructions, that cause the device to generate the one or more metadata tags, cause the device to: generate a metadata tag for a logical entity set, of the one or more logical entity sets, based on a position of the logical entity set within the one or more logical entity sets.

2. The device of claim 1, wherein the one or more processors are further configured to: receive a request for the video file; and transmit a message including the video file and the metadata file.

3. The device of claim 1, wherein the one or more processors, to receive the video file, are configured to: obtain the video file from a data repository; and wherein the one or more processors, to store the metadata file, are configured to: store the metadata file in the data repository in association with the video file.

4. The device of claim 1, wherein the one or more processors are further configured to: receive a search query; search, using the search query, a data repository storing a set of metadata files that includes the metadata file for the video file; determine a match between the search query and a metadata tag of the metadata file; and return, based on the match between the search query and the metadata tag, the video file.

5. The device of claim 1, wherein the one or more processors are further configured to: receive a search query; search, using the search query, a data repository storing a set of metadata files that includes the metadata file for the video file; determine a match between the search query and a metadata tag of the metadata file; and return, based on the match between the search query and the metadata tag, a new video file including a logical entity set, of the one or more logical camera scenes, associated with the match between the search query and the metadata tag.

6. A non-transitory computer-readable medium storing a set of instructions, the set of instructions comprising:

one or more instructions that, when executed by one or more processors of a device, cause the device to:

receive a multimedia content file;

process the multimedia content file to divide the multimedia content file into a set of logical entities;

process the set of logical entities using a machine learning model to generate a set of embeddings for each logical entity, of the set of logical entities, wherein a quantity of embeddings generated for each logical entity of the set of logical entities is based on a length of each logical entity;

compare groups of logical entities, of the set of logical entities, to generate a similarity metric;

selectively merge, based on the similarity metric satisfying a threshold, a pair of logical entities, in a group of logical entities of the groups of logical entities, to generate one or more logical entity sets, wherein a logical entity set, of the one or more logical entity sets, includes one or more logical entities;

generate one or more metadata tags for the one or more logical entity sets; and transmit the one or more metadata tags concurrently with the generation of the one or more logical entities, wherein the multimedia content file is associated with a live stream and the one or more metadata tags are included into the live stream;

wherein the one or more instructions, that cause the device to generate the one or more metadata tags, cause the device to: generate a metadata tag for a logical entity set, of the one or more logical entity sets, based on a position of the logical entity set within the one or more logical entity sets.

7. The non-transitory computer-readable medium of claim 6, wherein the one or more instructions, that cause the device to generate the one or more metadata tags, cause the device to: generate a metadata tag for a logical entity set, of the one or more logical entity sets, based on a computer vision analysis of one or more objects detected within the logical entity set.

8. The non-transitory computer-readable medium of claim 6, wherein the one or more instructions, that cause the device to generate the one or more metadata tags, cause the device to: generate a metadata tag for a logical entity set, of the one or more logical entity sets, based on a natural language processing analysis of audio associated with the logical entity set.

9. The non-transitory computer-readable medium of claim 6, wherein a first logical entity set, of the one or more logical entity sets, includes a first logical entity and a second logical entity, and a second logical entity set, of the one or more logical entity sets, includes a third logical entity, and wherein the third logical entity is between the first logical entity and the second logical entity in an order of logical entities within the multimedia content file.

10. The non-transitory computer-readable medium of claim 6, wherein a logical entity set, of the one or more logical entity sets, includes a first logical entity, a second logical entity, and a third logical entity in consecutive order, and wherein the first logical entity and the third logical entity are associated with the similarity metric satisfying the threshold, and wherein the second logical entity is included in the logical entity set based at least on being between the first logical entity and the third logical entity in consecutive order.

11. The non-transitory computer-readable medium of claim 6, wherein the machine learning model includes at least one of a zero-shot video transformer model or a modality transformer model.

12. The non-transitory computer-readable medium of claim 6, wherein the similarity metric is a cosine similarity metric.

13. The non-transitory computer-readable medium of claim 6, wherein the multimedia content file includes video content, wherein a logical entity, of the set of logical entities, is a logical camera shot, and wherein a logical entity set, of the one or more logical entity sets, is a logical camera scene.

14. The non-transitory computer-readable medium of claim 6, wherein the multimedia content file includes audio content, wherein a logical entity, of the set of logical entities, is a logical audio recording, and wherein a logical entity set, of the one or more logical entity sets, is a logical camera scene.

15. A method, comprising:

receiving, by a device, a multimedia content file;

dividing, by the device, the multimedia content file into a set of logical entities;

generating, by the device and using a machine learning model, a set of embeddings for each logical entity of the set of logical entities, wherein a quantity of embeddings generated for each logical entity of the set of logical entities is based on a length of each logical entity;

comparing, by the device, groups of logical entities, of the set of logical entities, to generate a similarity metric;

selectively merging, by the device and based on the similarity metric satisfying a threshold, a pair of logical entities, in a group of logical entities of the groups of logical entities, to generate one or more logical entity sets, wherein a logical entity set, of the one or more logical entity sets, includes one or more logical entities;

processing, by the device, the one or more logical entity sets to generate one or more metadata tags for the one or more logical entity sets;

transmitting the one or more metadata tags concurrently with the generation of the one or more logical entity sets, wherein the multimedia content file is associated with a live stream and the one or more metadata tags are included into the live stream; and storing, by the device, a metadata file including the one or more metadata tags in connection with the multimedia content file;

wherein generating a metadata tag for a logical entity set, of the one or more logical entity sets, is based on a position of the logical entity set within the one or more logical entity sets.

16. The method of claim 15, wherein the multimedia content file does not include metadata labeling logical entities or logical entity sets.

17. The method of claim 15, wherein a single logical entity is divided into a plurality of logical entities based on a length of the single logical entity.

18. The method of claim 15, further comprising: receiving a request for the multimedia content file; and transmitting a message including the multimedia content file and the metadata file.

19. The method of claim 15, wherein the machine learning model includes at least one of a zero-shot video transformer model or a modality transformer model.

\* \* \* \* \*